United States Patent [19]

Hunter

[11] Patent Number: 5,275,449
[45] Date of Patent: Jan. 4, 1994

[54] ELONGATED MEMBER FOR JOINING DUCTS

[75] Inventor: A. Reese Hunter, Greensboro, N.C.

[73] Assignee: Industrial Air, Inc., Greensboro, N.C.

[21] Appl. No.: 818,813

[22] Filed: Jan. 10, 1992

[51] Int. Cl.$^5$ ............................................. F16L 23/00
[52] U.S. Cl. .................... 285/363; 411/918; 411/437; 285/424; 285/364; 285/405; 52/463
[58] Field of Search ............... 411/918, 436, 437; 285/363, 364, 424, 405, 406, 412; 24/555, 563; 52/464, 463

[56] References Cited

U.S. PATENT DOCUMENTS

| | | | |
|---|---|---|---|
| 1,779,346 | 10/1930 | Trachte | 411/918 |
| 1,793,127 | 2/1931 | Osius | 411/918 |
| 1,826,133 | 10/1931 | Hatch | 411/918 |
| 2,334,046 | 11/1943 | Tinnerman | 411/918 |
| 2,491,700 | 12/1949 | Zwerling . | |
| 2,531,349 | 11/1950 | Brett . | |
| 3,198,561 | 8/1965 | Witt . | |
| 3,199,901 | 8/1965 | Jeppsson . | |
| 3,387,809 | 6/1968 | Zwerling . | |
| 3,451,696 | 6/1969 | Hagelin . | |
| 3,482,861 | 12/1969 | Keating . | |
| 3,630,549 | 12/1971 | Grimm . | |
| 4,461,499 | 7/1984 | Hunter et al. | 285/364 |
| 4,537,430 | 8/1985 | Sullivan . | |
| 4,865,365 | 9/1989 | Meinig . | |
| 5,103,872 | 4/1992 | Jyh-Long | 285/364 |

FOREIGN PATENT DOCUMENTS

| | | | |
|---|---|---|---|
| 2414815 | 10/1975 | Fed. Rep. of Germany | 285/424 |
| 1346366 | 2/1974 | United Kingdom | 285/424 |

Primary Examiner—Eric K. Nicholson
Attorney, Agent, or Firm—Rhodes, Coats and Bennett

[57] ABSTRACT

An apparatus for joining flanged, abutting duct ends or for reinforcing ducts comprises an elongated coupling member including a V-shaped portion made up of two slanting walls approaching an apex and having lower portions spaced apart a given distance. It also includes inwardly turned edges on the slanting walls spaced from the apex, extensions of the slanting walls diverging from one another as the slanting walls approach the apex extending from the slanting walls a distance about equal to the given distance, and a joining portion extending from the extensions doubling back over the apex. The extensions and the joining portions have substantial parallel segments with a curved connection between the parallel segments. The edges, slanting walls, extensions and joining portion being integrally formed of sheet metal. The inwardly turned edges may be urged onto straddling relationship with flanged duct ends to hold the ends together and the V-shaped portion, extensions and joining portion provide a strong, reinforced duct joint. Or the coupling member may be affixed to a sidewall of a duct to reinforce the duct.

8 Claims, 2 Drawing Sheets

ELONGATED MEMBER FOR JOINING DUCTS

BACKGROUND OF THE INVENTION

The present invention relates to improvements in coupling members for connecting flanged duct ends.

In particular, it relates to an improvement in the duct connector disclosed in U.S. Pat. No. 4,461,499 to Hunter et al entitled "Transverse Joint System for sheet Metal Ducts", the entire disclosure of which is incorporated herein by reference. That patent is assigned to the assignee of the present application, and it depicts a system for connecting sheet metal duct sections. That system has proven to be very useful over the years. It includes flanging the ends of sheet metal ducts, abutting them at an interface and forming a plurality of spaced tabs in the wall surface of the flanges, which tabs protrude outwardly in a direction away from the interface. A generally V-shaped coupling member having sidewalls with free edges folded back under the corresponding side wall is then assembled over a pair of abutted flanges, with the edges of the folded under portions snapping in behind the tabs to lock the flanges together. Such V-shaped coupling members are arrayed around the periphery of the duct and, at their intersection, are interleaved. The coupling members are secured by drilling the interleaved portions and joining them with a nut and bolt arrangement.

The present invention focuses on improving the coupling member so that when it couples the flanged ends of the ducts together, the joint has a greater strength than the coupling member of the aforementioned patent. The coupling member of the present invention may also be used as a reinforcement of a duct side wall, spaced from the joint, as disclosed in my copending application entitled "Duct Reinforcement", Ser. No. 819,405, filed Jan. 10, 1992. The invention may also be configured to be used in conjunction with corner pieces as described in my copending application entitled "Corner Pieces for Improved Duct Connector", Ser. No. 818,848 filed Jan. 10, 1992 herewith. The disclosures of the two aforementioned applications are incorporated herein by reference.

The strength of the joint provided by the coupling member as described in my prior patent is adequate for most circumstances, however, when very large cross section ducts are to be joined, additional reinforcement is desirable to prevent sagging, bowing and bulging caused by high inner pressures. While other reinforcement means are known, including applying angle irons to the outside of the ducts, the installation of those angle irons in addition to the installation of the coupling member adds labor and parts expense. Thus, it would be advantageous if these expenses could be avoided.

SUMMARY OF THE INVENTION

The present invention fulfills this need in the art by providing an apparatus for joining flanged, abutting duct ends or for reinforcing ducts. The apparatus includes an elongated coupling member including a V-shaped portion made up of two slanting walls approaching an apex. Inwardly turned edges on the slanting walls are spaced from the apex, and extensions of the slanting walls diverge from one another as the slanting walls approach the apex. A joining portion extends from the extensions, doubling back over the apex. The inwardly turned edges may be urged onto straddling relationship with flanged duct ends to hold the ends together and the V-shaped portion, extensions and joining portion provide a strong, reinforced duct joint. Or, the coupling member may be affixed to a sidewall of a duct at a location other than at a joint to reinforce the duct.

Typically, the edges, slanting walls, extensions and joining portion are integrally formed of sheet metal. Preferably the slanting walls have lower portions spaced apart a given distance and the extensions extend from the slanting walls a distance about equal to the given distance.

In a preferred embodiment the extensions and the joining portions have substantial parallel segments, and the extensions and the joining portions are integrally formed with a curved connection between them.

In one embodiment the coupling member is about as long as the length of the side of the duct, and corner pieces join adjacent coupling members to complete circumscription of the duct. Alternatively, the coupling members may be long enough to intersect and be held together by interleaving and/or by fasteners.

The invention also provides a duct as joined with the coupling member and/or reinforced with the coupling members.

BRIEF DESCRIPTION OF THE DRAWINGS

The invention will be better understood after a reading of the detailed description of the preferred embodiments and a review of the drawings in which.

DETAILED DESCRIPTION OF THE PREFERRED EMBODIMENTS

Figure 1:
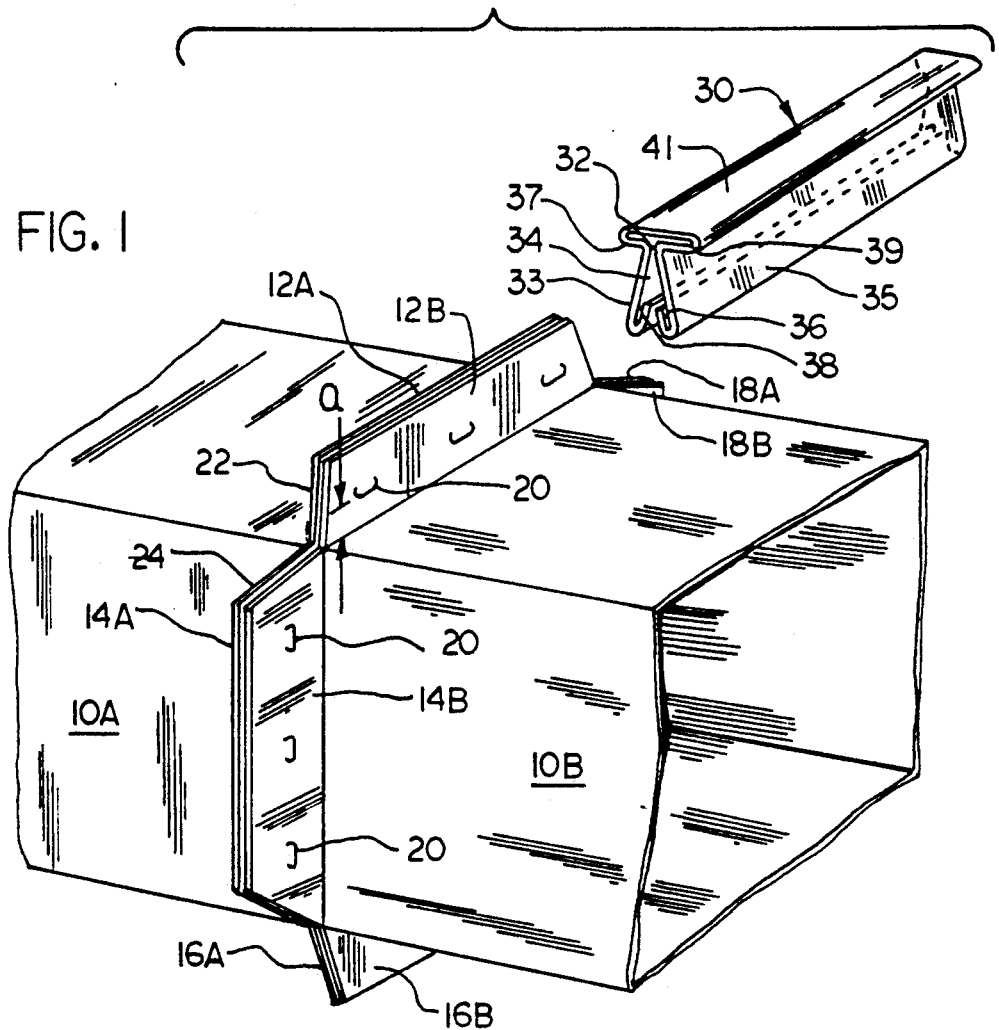
FIG. 1 is a perspective view of an improved coupling member in accordance with the present invention suitable for installation on the joint of abutting duct sections.

As can be seen in FIG. 1, two duct sections 10A and 10B are provided with outwardly extending flanges 12A,14A,16A,18A,12B,14B,16B,18B. If desired, the flanges may be provided with tabs 20 in accordance with the invention as described in our prior U.S. Pat. No. 4,461,499. A coupling member 30 includes a V-shaped portion 34 made up of two slanting sides 33,35 approaching an apex 32. Each side terminates in an inwardly turned edge 38,36 respectively. Spaced from the inwardly turned edges are extensions 37,39 which diverge from the apex. The extensions 37,39 turn back on themselves to form a joining portion 41. As can be seen, substantial portions of the extensions 37,39 are parallel with the joining portion 41. The extra corrugations caused by turning out the extensions 37,39 and then turning them back on themselves provides longitudinal rigidity to the coupling member 30. Also, they add additional material to the coupling member to provide additional strength.

In the embodiment shown in FIG. 1, the coupling member 30 is shown about as long as the length of the flanges 12A,12B. The coupling member 30 is slipped over the abutted flanges 12A,12B and pressed home until the inwardly turned edges 36,38 snap behind the tabs 20. Similar coupling members are applied to the other flange pairs 14A,14B,16A,16B,18A,18B. The corners of the joint may be completed by the addition of corner pieces as desired. Particular corner piece embodiments can include any of those set forth in my copending application entitled "Corner Pieces for Improved Duct Connector", mentioned above.

Figure 2:
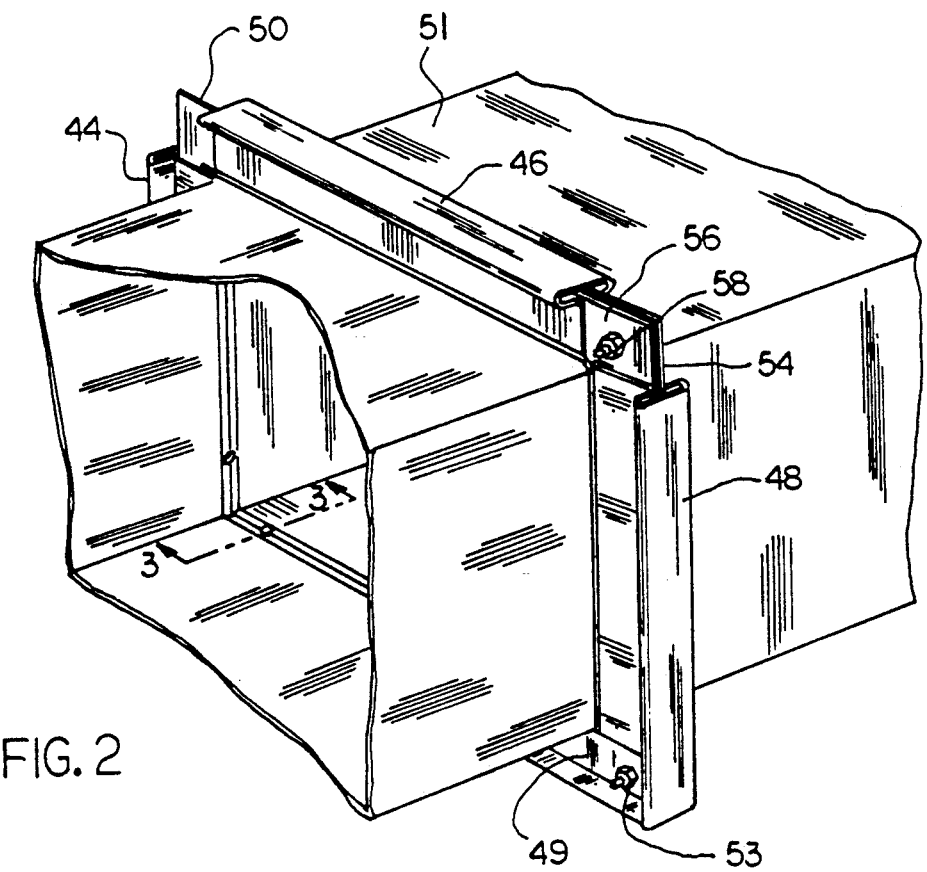

Referring to FIG. 2, a perspective view of a duct having several units of the reinforcing duct coupling of the present invention installed in it will be of assistance in further understanding the invention. In FIG. 2, the coupling members 44,46,48,49 are shown mounted on a duct 51 provided with a bead reinforcement as discussed in my copending application entitled "Duct Reinforcement" mentioned above. The coupling member shown in FIG. 2 may, of course, also be used to join duct section as discussed above in connection with FIG. 1. In FIG. 2, the coupling members 44,46 are provided of a length of about the same as the length of the corresponding duct side wall. Thus, a corner piece 50 is provided to complete the corner where the two coupling members 44,46 meet. The coupling member 50 shown in FIG. 2 is a single piece coupling member.

Coupling members 48,49 are shown somewhat longer so that they intersect and their sidewalls are interleaved at their intersection point. The intersected and interleaved coupling members 48,49 can then be drilled with a hole and joined with a nut and bolt 53.

The intersection of the coupling members 46,48 is completed with a two-piece corner piece. That is, the corner piece has one leg 56 which extends into coupling member 46 and another leg 54 which extends into coupling member 48. The two legs 54,56 are then joined by a nut and bolt 58.

As will be apparent, the three corner treatments shown in FIG. 2 are exemplary only. Various other corner arrangements can be substituted. Moreover, in actual practice, in a given installation, all of the corners are usually treated identically, rather than the multiple modes shown here for illustration purposes.

Figure 3:
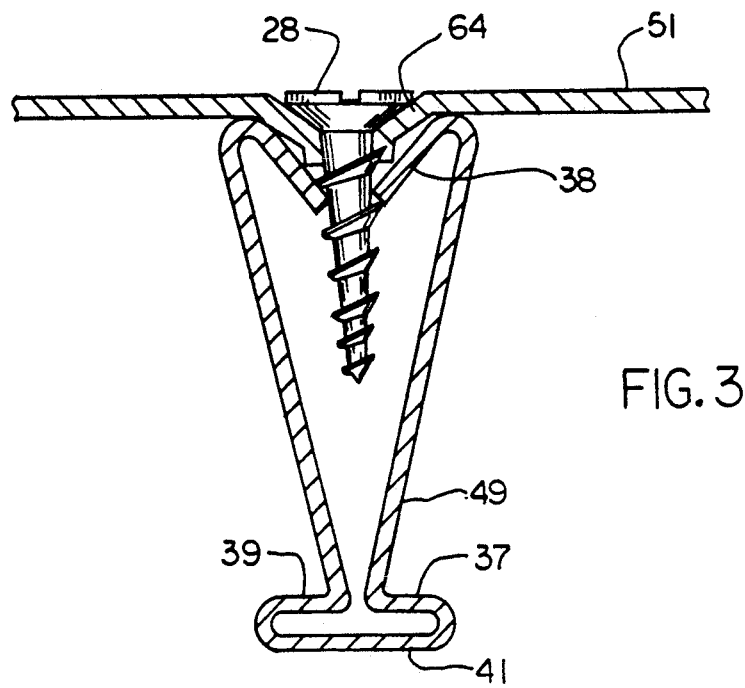
FIG. 2 is a perspective view of various embodiments of the coupling member of the present invention as installed on a duct for reinforcement purposes and FIG. 3 is a sectional view of the embodiment of FIG. 2 taken along lines 3—3 looking the direction of the arrows.

Referring now to FIG. 3, as a sectional view along lines 3—3 of FIG. 2, the wall of the duct 51 is provided with a bead 64, as is conventional. The coupling member 49 is installed so that the inwardly turned edges 36,38 straddle the bead 64. A self-tapping screw 28 is then driven outwardly through the bead 64 so that its threads 43 engage the inwardly turned edges 36,38 to hold the coupling member 49 in place.

The extensions 37,39 thus provide additional rigidity to the coupling member 49 to aid in its reinforcement of the duct 51.

Those of ordinary skill in the art will appreciate that various modifications to the invention could be made and still fall within the scope of the invention. For example, various other deformations of the extensions 37,39 could be implemented, including bowing them down toward the edges 36,38. Or, their size could be varied or additional corrugations could be included. All of these are deemed to be within the scope of the invention.

What is claimed is:

1. A sheet metal duct joint comprising flanged, abutting sheet metal duct ends including a plurality of abutting flange pairs and a plurality of elongated coupling members, said coupling members including
   a V-shaped portion made up of two slanting walls approaching an apex, inwardly turned edges on said slanting walls spaced from said apex, extensions of said slanting walls diverging from one another as said slanting walls approach said apex, and
   a joining portion extending from said extensions doubling back over said apex,
   each said coupling member having its inwardly turned edges straddling one of said flanged pairs to hold the ends together and said V-shaped portions, extensions and joining portions providing a strong, reinforced duct joint.

2. An apparatus as claimed in claim 1 wherein said edges, slanting walls, extensions and joining portion are integrally formed of sheet metal.

3. An apparatus as claimed in claim 1 wherein said slanting walls have lower portions spaced apart a given distance and said extensions extend from said slanting walls a distance about equal to said given distance.

4. An apparatus as claimed in claim 1 wherein said extensions and said joining portions have substantial parallel segments.

5. An apparatus as claimed in claim 1 wherein said extensions and said joining portions are integrally formed with a curved connection between them.

6. An apparatus as claimed in claim 1 wherein said coupling members are about as long as the length of a side of the duct and further comprising corner pieces joining adjacent coupling members to complete circumscription of the duct.

7. An apparatus as claimed in claim 1 wherein said duct has corners and the coupling members are long enough to intersect at said corners of said duct and are held together by interleaving.

8. An apparatus as claimed in claim 1 wherein said duct has corners and the coupling members are long enough to intersect at said corners of said duct and are held together by fasteners.

* * * * *